(12) United States Patent
Guo

(10) Patent No.: US 11,861,485 B2
(45) Date of Patent: Jan. 2, 2024

(54) DATA FORMAT TRANSFORM METHOD TO IMPROVE AI ENGINE MAC UTILIZATION

(71) Applicant: Baidu USA LLC, Sunnyvale, CA (US)

(72) Inventor: Min Guo, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 765 days.

(21) Appl. No.: 16/692,848

(22) Filed: Nov. 22, 2019

(65) Prior Publication Data

US 2021/0158130 A1 May 27, 2021

(51) Int. Cl.
*G06N 3/063* (2023.01)
*G06N 5/04* (2023.01)
*G06F 7/544* (2006.01)

(52) U.S. Cl.
CPC .......... *G06N 3/063* (2013.01); *G06F 7/5443* (2013.01); *G06N 5/04* (2013.01)

(58) Field of Classification Search
CPC ............ G06N 3/063; G06N 3/06; G06N 3/04; G06N 5/04; G06F 7/5443; G06F 7/544
See application file for complete search history.

(56) References Cited

U.S. PATENT DOCUMENTS

| | | | | |
|---|---|---|---|---|
| 9,471,840 | B2* | 10/2016 | Govil | G06V 10/20 |
| 10,831,693 | B1* | 11/2020 | Huang | G06N 3/063 |
| 11,194,490 | B1* | 12/2021 | Sunkavalli | G06F 7/5443 |
| 2019/0114534 | A1* | 4/2019 | Teng | G06N 3/063 |
| 2019/0236049 | A1* | 8/2019 | Vantrease | G06N 3/063 |
| 2019/0286153 | A1* | 9/2019 | Rankawat | G06N 3/08 |
| 2019/0311243 | A1* | 10/2019 | Whatmough | G06N 3/063 |
| 2021/0233214 | A1* | 7/2021 | Liu | G06N 3/0454 |

* cited by examiner

*Primary Examiner* — Kamran Afshar
*Assistant Examiner* — Brian J Hales
(74) *Attorney, Agent, or Firm* — WOMBLE BOND DICKINSON (US) LLP

(57) ABSTRACT

A data format converter rearranges data of an input image for input to a systolic array of multiply and accumulate processing elements. The image has a pixel height and a pixel width in a number of channels equal to a number of colors per pixel. The data format converter rearranges the data to a second, greater number of channels and inputs the second number of channels to one side of the systolic array. The second number of channels is less than or equal to the number of MAC PEs on the one side of the systolic array, and results in greater MAC PE utilization in the systolic array.

17 Claims, 7 Drawing Sheets

Experiment Results 502

| Input Size | Conv1 | MAC Utilization |
|---|---|---|
| 416*416*3 | 3×3×16 | 10.55% |
| 208*208*48 | 3×3×16 | 24.11% |
| 104*104*192 | 3×3×16 | 25.00% |

506  504

Configuration
- Array Size: 64×64
- SRAM IFMAP: 2048
- SRAM Filter: 2048
- SRAM OFMAP: 2048
- YOLO Tiny Model
- Dataflow: Weight Stationary

FIG. 5

DATA FORMAT TRANSFORM METHOD TO IMPROVE AI ENGINE MAC UTILIZATION

BACKGROUND

Artificial intelligence (AI) engines with systolic arrays of multiply and accumulate (MAC) processing elements (PEs) are in usage for image processing, image recognition and other computational tasks. Generally, data of an image is input into a systolic array in three channels, one each for red, green and blue colors (RGB). The systolic array may be used for implementing a neural net, also known as an artificial neural network (ANN). There is an ongoing need for improvements in efficiency and operation of systolic arrays, AI engines and neural networks.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 depicts experimental results, comparing MAC PE utilization in a systolic array for various numbers of channels.

DETAILED DESCRIPTION

Figure 1:
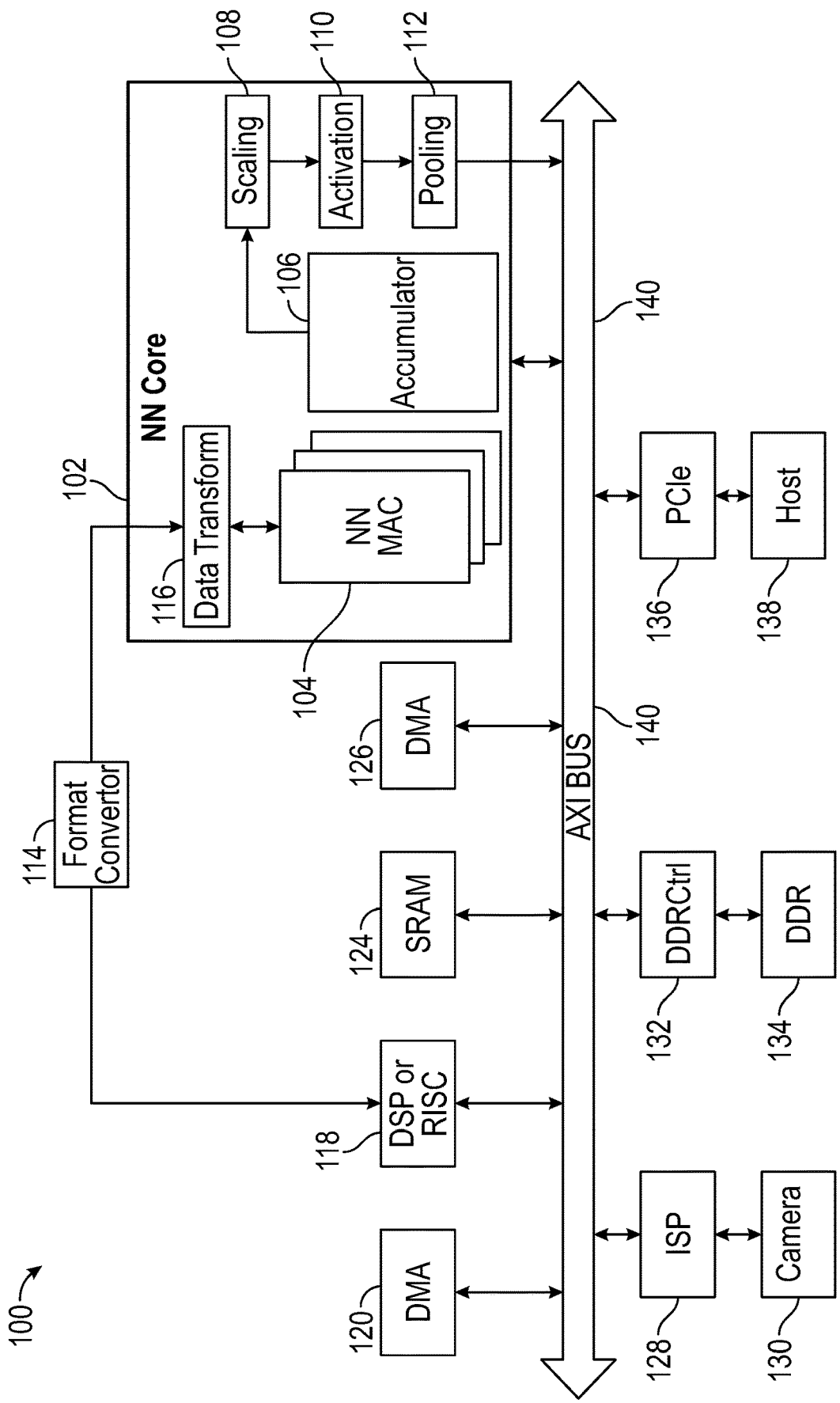
FIG. 1 is a block diagram of an AI engine with a systolic array of N by N MAC PEs, showing two example locations for a data format converter in accordance with embodiments of the present disclosure.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily alt refer to the same embodiment.

When performing image processing in a systolic array, generally of M by N multiply accumulate (MAC) processing elements (PEs), the first convolution layer normally represents 10 to 15% of the total computation performed, due to the large spatial size of the input image. Usually, the input channel is RGB (red, green, blue) format, or three channels of image data, which has low MAC utilization in the first couple of convolution layers of inference of a neural net. The computation in the first couple of convolution layers does not map well into PE array based AI engine architectures, because less channels are offered in the first couple of convolution layers, meaning that the majority of the array's input bandwidth may not be utilized. Especially, the MAC utilization is low for the first couple of layers if the PE size (i.e., number of PEs in the systolic array) is large.

One solution to this problem uses two systolic arrays, one systolic array specifically designated to the first layer and the other systolic array used for the remaining convolution layers in the CNN. The solution described herein uses one systolic array, and a format converter to more closely match the number of channels of image data to the number of PEs in each of the first couple of layers of the systolic array, and achieve higher utilization of the MAC PEs.

In one embodiment, an AI engine includes a systolic array and a data format converter. The systolic array of M by N multiply and accumulate (MAC) processing elements (PEs) has N MAC PEs on one side for input of up to N channels of image data. The data format converter rearranges data of the input image. The data of the input image has a pixel height and a pixel width in a first number of channels. The first number of channels is equal to the number of colors per pixel. The data format converter rearranges the data to a second, greater number of channels. Each of the second number of channels has data of a lesser pixel height, a lesser pixel width and one of the colors. The data format converter inputs the second number of channels to the one side of the systolic array. The second number of channels is less than or equal to N and closer to N than the first number of channels, and results in greater MAC PE utilization in the first and second convolution layer inferences in the systolic array than would be so for inputting the first number of channels to the one side of the systolic array.

One embodiment is a method of operating an AI engine. Data of an input image has a pixel height and a pixel width in a first number of channels. The first number of channels is equal to a number of colors per pixel. The data of the input image is arranged to a second, greater number of channels. Each of the second number of channels has data of a lesser pixel height, a lesser pixel width, and one of the colors. The second number of channels is input to one side of a systolic array. The systolic array has M by N MAC PEs with N MAC on one side for input of up to N channels of image data. The second number of channels is less than or equal to N and closer to N than the first number of channels. Use of the second number of channels results in greater MAC PE utilization in the first and second convolution layer inference in the systolic array than would be so for inputting the first number of channels to the one side of the systolic array. One embodiment is a tangible, non-transitory, computer-readable media that has instructions on it. The instructions cause a processor to perform a method, described below.

Data of an input image has a pixel height and a pixel width in a first number of channels. The first number of channels is equal to a number of colors per pixel. The data of the input image is arranged to a second, greater number of channels.

Each of the second number of channels has data of a lesser pixel height, a lesser pixel width, and one of the colors. The second number of channels is input to one side of a systolic array. The systolic array has M by N MAC PEs with N MAC on one side for input of up to N channels of image data. The second number of channels is less than or equal to N and closer to N than the first number of channels. Use of the second number of channels results in greater MAC PE utilization in the first and second convolution layer inference in the systolic array than would be so for inputting the first number of channels to the one side of the systolic array. Other aspects and advantages of the embodiments will become apparent from the following detailed description taken in conjunction with the accompanying drawings which illustrate, by way of example, the principles of the described embodiments.

FIG. 1 is a block diagram of an AI (artificial intelligence) engine 100 with a systolic array 104 of N by N MAC PEs, showing two example locations for a data format converter 114 in accordance with embodiments of the present disclosure. The AI engine 100 has a neural network core 102 that includes the systolic array 104, an accumulator at the output of the systolic array 104, a scaling module 108 that receives output from the accumulator 106, an activation module 110 that receives output from the scaling module 108, and a pooling module 112 that receives output from the activation module 110.

Further components in the AI engine 100 include a DMA (direct memory access) module 120, a DSP (digital signal processor) or RISC (reduced instruction set computer) 118, SRAM (static random access memory) 124, another DMA module 126, ISP (image signal processor) 128 coupled to a camera 130, DDR (dual data rate) controller 132 connected to DDR (dual data rate) memory 134, PCIe (peripheral control interface express) interface 136 coupled to a host 138, ail connected to and communicating through a bus 140, in this example an AXI (advanced extensible interface) bus 140. Embodiments of the format converter 114 can be implemented in a DSP, in a RISC (i.e., DSP or RISC 118), or in a data transform module 116 coupled to the systolic array 104 in the neural net core 102. This AI engine 100 is an example that is suitable for a format converter 114, and further embodiments of AI engines that could use a format converter 114 are readily devised in keeping with the teachings herein.

Figure 2:
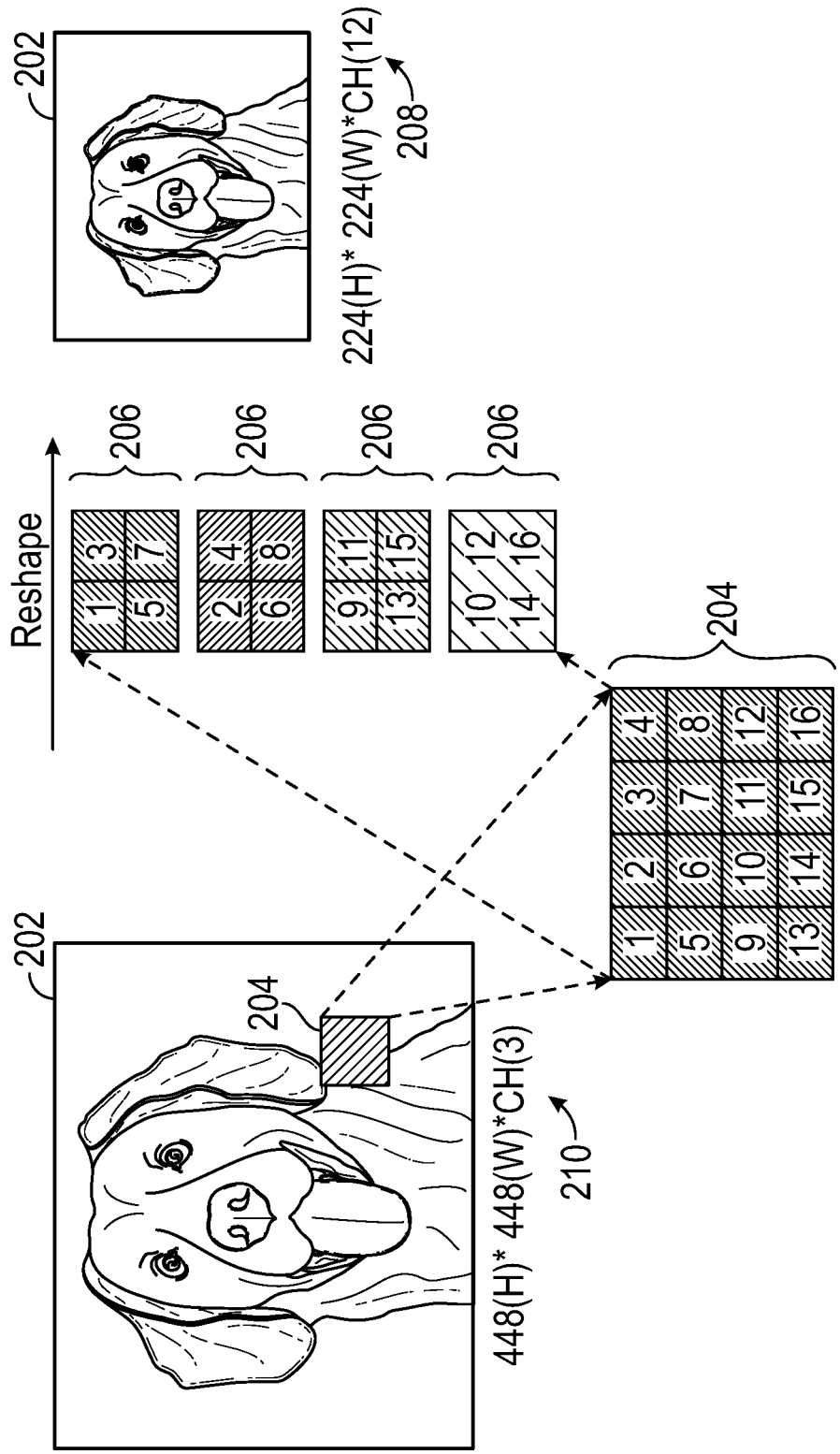
FIG. 2 illustrates an example of rearranging data of an input image from three channels (red, green, blue) to twelve channels, for improved MAC PE utilization in a systolic array, as performed by the data format converter.

FIG. 2 illustrates an example of rearranging data of an input image 202 from three channels 210 (red, green, blue or RGB) to twelve channels 208, for improved MAC PE utilization in a systolic array, as performed by the data format converter 114. To start with, the image 202 in this example has a pixel height of 448 and a pixel width of 448, in three channels 210 (i.e., RGB channels). Each pixel in the image 202 has a red value, a green value and a blue value, and each of these color values is output in a respective channel 210.

The data format converter 114 arranges the image into groups 204 of pixels. In this example each pixel group 204 is a 4×4 group of pixels, i.e., a group 204 of pixel height four and pixel width four, with each pixel having three color values. Then, the data format converter 114 arranges the data of each pixel group 204 into four subgroups 206 that each have a 2×2 group of pixels. That is, each of the four subgroups 206 has a pixel height of two and a pixel width of two, again with each pixel having three color values. In one embodiment, the subgroup 206 includes pixels that are adjacent in the subgroup but that are nonadjacent in the image 202. For example, the uppermost subgroup 206 has adjacent pixels 1 and 3, but pixels 1 and 3 are not adjacent in the pixel group 204 and the image 202.

Next, the data format converter 114 arranges the data of each subgroup 206 into separate channels for each of the colors (red, green, blue) and outputs these as respective channels. In this example, this results in four subgroups times three colors each, for a total of twelve channels 208.

In various embodiments, this example of rearranging data of an input image is generalized to various image sizes and various numbers of channels. The objective is to increase the number of channels to the input of the systolic array, for greater utilization of the MAC PEs in the first and second layers of the systolic array. The action of rearranging image data into a greater number of channels can be implemented in hardware, software executing on one or more processors, firmware, or combinations thereof, in various combinations of serial operations and parallel operations in various embodiments.

Figure 3:
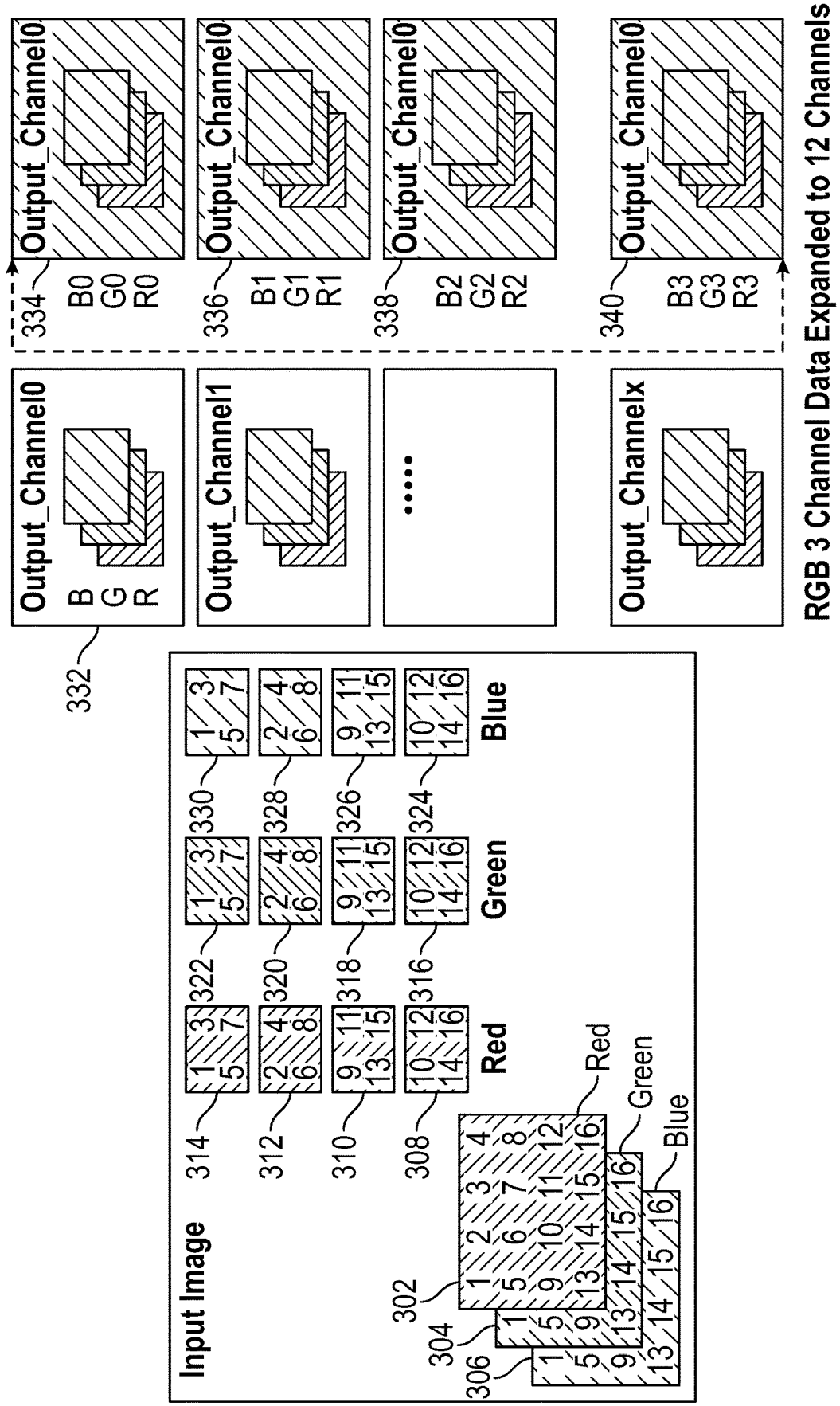
FIG. 3 depicts further details in an example of rearranging data of an input image from three channels to twelve channels.

FIG. 3 depicts further details in an example of rearranging data of an input image 202 from three channels 210 to twelve channels 208. In FIG. 3, the 4×4 pixel group 204 (see FIG. 2) is arranged as three, 4×4 pixel color groups 302, 304, 306, one for each color red, green, blue. The respective color value for each pixel in the 4×4 pixel group 204 is represented in the respective 4×4 pixel color group. The red values for the pixels of the 4×4 pixel group 204 are in the red 4×4 pixel color group 302, the green values for the pixels of the 4×4 pixel group 204 are in the green 4×4 pixel color group 304, and the blue values for the pixels of the 4×4 pixel group 204 are in the blue 4×4 pixel color group 306.

Each 4×4 pixel color group 302, 304, 306 is arranged as four 2×2 pixel color subgroups. The red 4×4 pixel color group 302 is arranged as four 2×2 pixel red subgroups 308, 310, 312, 314. The green 4×4 pixel color group 304 is arranged as four 2×2 pixel green subgroups 316, 318, 320, 322. The blue 4×4 pixel color group 306 is arranged as four 2×2 pixel blue subgroups 324, 326, 328, 330. Each of the four 2×2 pixel color subgroups, for each of the three colors, is output as a respective channel, to the systolic array 104 (see FIG. 1), for a total of twelve channels.

This is further depicted in the right half of FIG. 3 as RGB three channel data 332 expanded to twelve channels. The RGB three channel data 332 is shown in three channels, R, G, B. The twelve output channels of the data format converter 114 are shown in groups. A 0th group 334 of three color channels R0, G0, B0 is from the 0th row of 2×2 pixel color subgroups 314, 322, 330. A first group 336 of three color channels R1, G1, B1 is from the first row of 2×2 pixel color subgroups 312, 320, 328. A second group 338 of three color channels R2, G2, B2 is from the second row of 2×2 pixel color subgroups 310, 318, 326. A third group 340 of three color channels R3, G3, B3 is from the third or bottom row of 2×2 pixel color subgroups 308, 316, 324.

Figure 4:
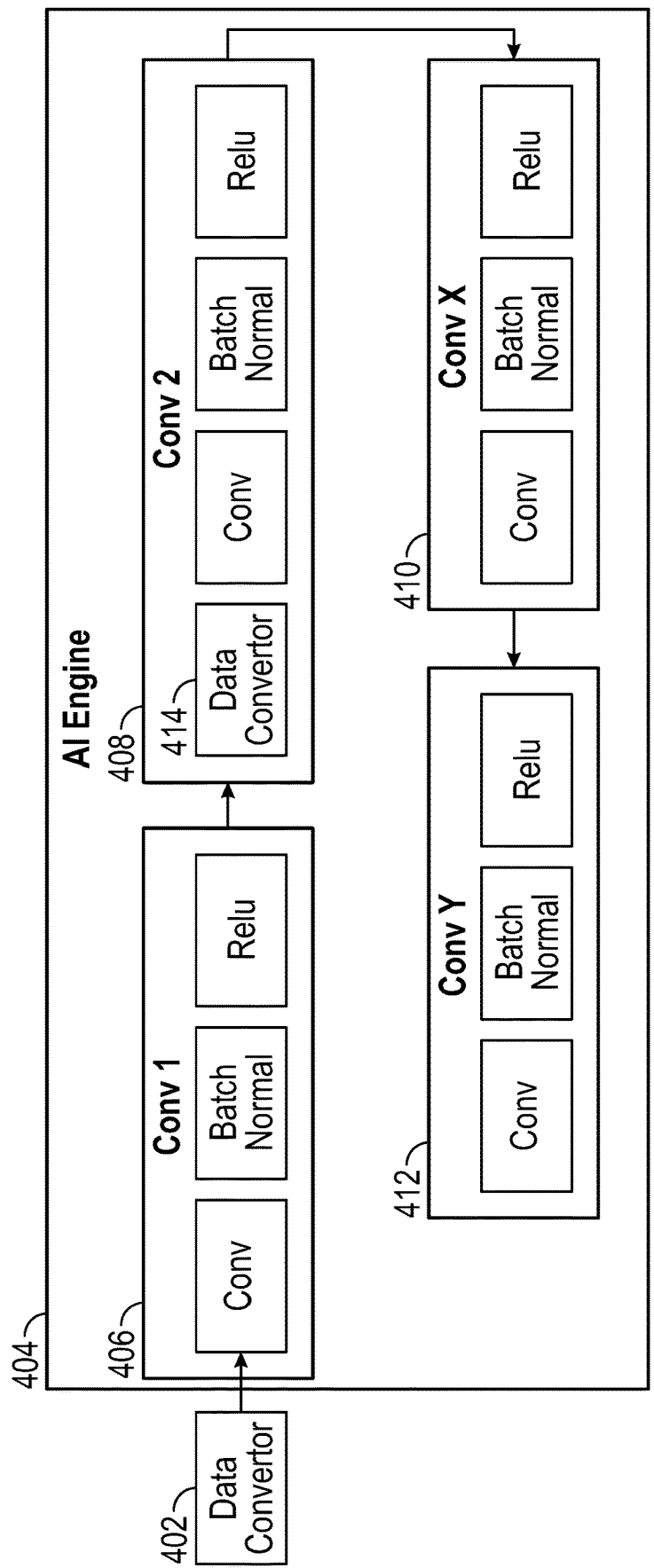
FIG. 4 depicts a data converter reshaping data into an AI engine, in an embodiment.

FIG. 4 depicts a data converter 402 reshaping data into an AI engine 404, in an embodiment. The AI engine 404 has multiple convolution layers 406, 408, 410, 412. Each convolution layer 406, 408, 410, 412 has a convolution module, a batch normalization module, and a Relu (rectified linear unit). The first convolution layer 406 receives output of the data converter 402. The second convolution layer 408 receives output of the first convolution layer 406 into a data converter 414. The third convolution layer 410 receives output of the second convolution layer 408. The fourth convolution layer 412 receives output of the third convolution layer 410.

Input images are reshaped by the data converter 402, for example using a CPU (central processing unit) or GPU (graphical processing unit), before feeding into the AI engine 404. Output of the first convolution layer 406 is reshaped by data converter 414 at the input of the second convolution layer 408. With these two data converters 402, 414, the first couple of layers are reshaped to increase the number of channels, because otherwise the channels would be much fewer than the number of MAC PEs receiving the channels.

In one embodiment, the data converter 414 at the input of the second convolution layer 408 is different from the data converter 402 that feeds into the AI engine 404, because the data converter 414 may also include NCHW→NHCW reshaping from one data format to another. For these data formats, N is the batch number, C is the number of channels (also known as feature MAPS), H is the height and W is the width.

FIG. 5 depicts experimental results, comparing MAC PE utilization in a systolic array for various numbers of channels. The configuration for the experiment has an array size 64×64, i.e., the systolic array 104 (see FIG. 1) has M equals N equals sixty-four. There is an SRAM IFMAP (static random access memory input feature map) of size 2048, an SRAM filter of size 2048, an SRAM OFMAP (static random access memory output feature map) of size 2048, a YOLO tiny model (an object detection deep learning model often used in mobile and ADAS for object detection), and a data flow of weight stationary. Weights Stationary means the model weights are loaded into the systolic array firstly and stay there until all the feature maps are passed thorough and multiplied by the stationary weights to then calculate the results.

An input size of 416×416 using three channels 502 was found to have a MAC utilization of 10.55%. An input size of 208×208 using forty-eight channels 504 was found to have a MAC utilization of 24.11%, which is more than double the MAC utilization of the three channel input. An input size of 104×104 using one hundred and ninety-two channels 506 was found to have an only slightly higher MAC utilization of 25.00%.

Analysis of the experimental results shows that the number of channels should be increased through rearranging of the image data, so that the number of channels is close to the number of PEs on the channel receiving side of the PE array. In this experiment, forty-eight channels 504 is closer in number to 64 PEs than three channels 502, and achieves higher MAC utilization. Analysis of the experimental results further shows that a number of channels larger than the number of PEs on the channel receiving side of the PE array does not significantly improve MAC utilization. In this experiment, one hundred and ninety-two channels 506 does not significantly improve MAC utilization over forty-eight channels 504.

Figure 6:
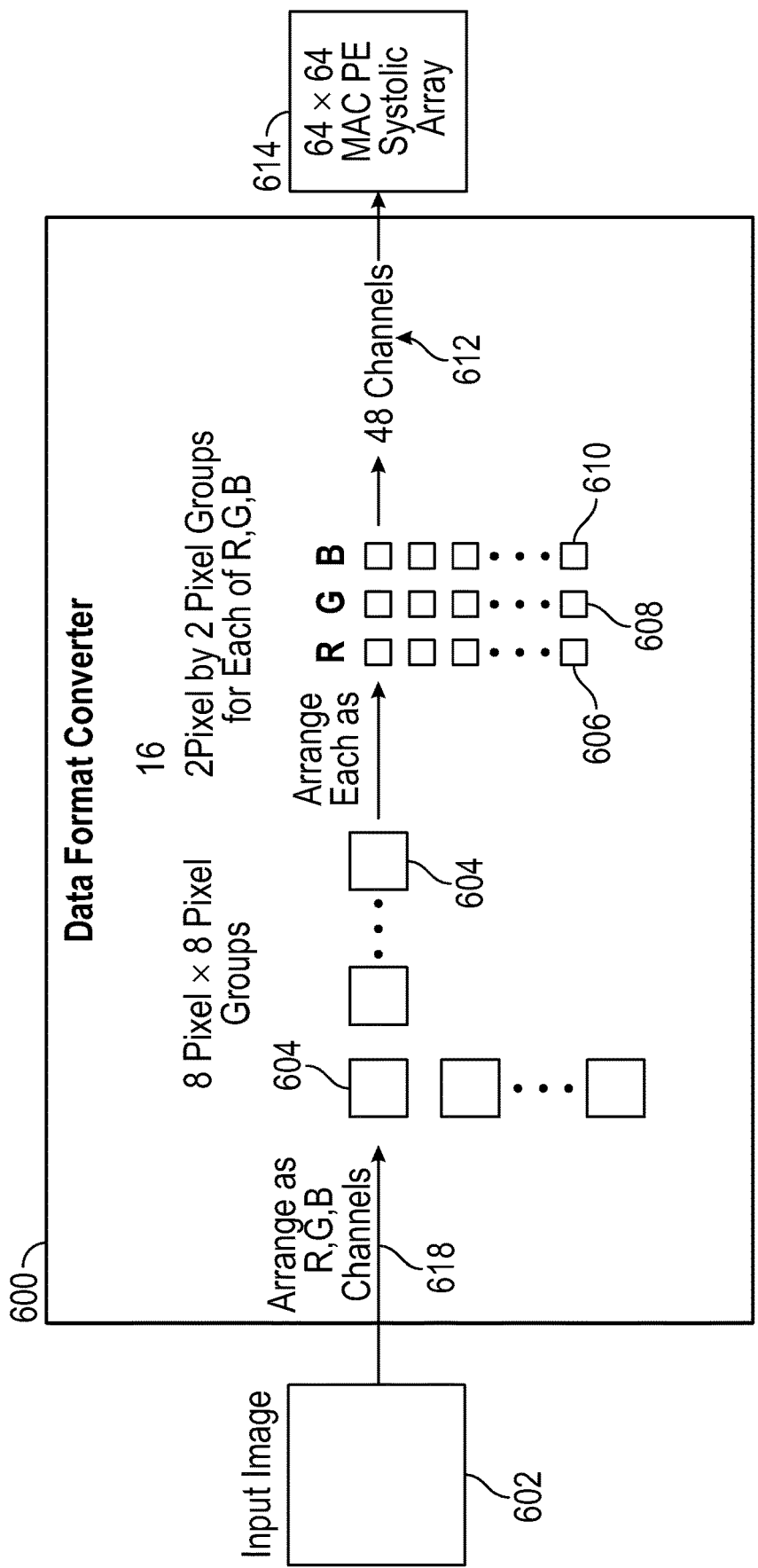
FIG. 6 illustrates an example of rearranging data of an input image from three channels (red, green, blue) to forty-eight channels, in an embodiment of the data format converter.

FIG. 6 illustrates an example of rearranging data of an input image 602 from three channels 618 (red, green, blue) to forty-eight channels 612, in an embodiment of the data format converter 600. Data of the input image 602 is input to the data format converter 600 as three channels 618, one each for RGB or red, green, blue. The data format converter 600 arranges the data in eight pixel by eight pixel groups (i.e., 8×8 pixel groups) 604. The data format converter 600 arranges each 8×8 pixel group 604 as sixteen two pixel by two pixel groups (i.e., 2×2 pixel groups) for each of red, green, blue colors. These forty-eight 2×2 pixel color groups are output as forty-eight channels 612 to a 64×64 MAC PE systolic array 614. Specifically in this example, the sixteen red 2×2 pixel color groups 606, sixteen green 2×2 pixel color groups 608, and the sixteen blue 2×2 pixel color groups 610 formed from each of the 8×8 pixel groups 604 are output as forty-eight channels 612.

It should be appreciated that further image sizes, arrangements of groups of pixels, subgroups or groups within groups of pixels, color groups or subgroups, and channels from data of an input image and from a data format converter are readily devised for further embodiments in keeping with the teachings herein. Image data can be rearranged in serial operations, parallel operations, or combinations thereof in various embodiments.

Figure 7:
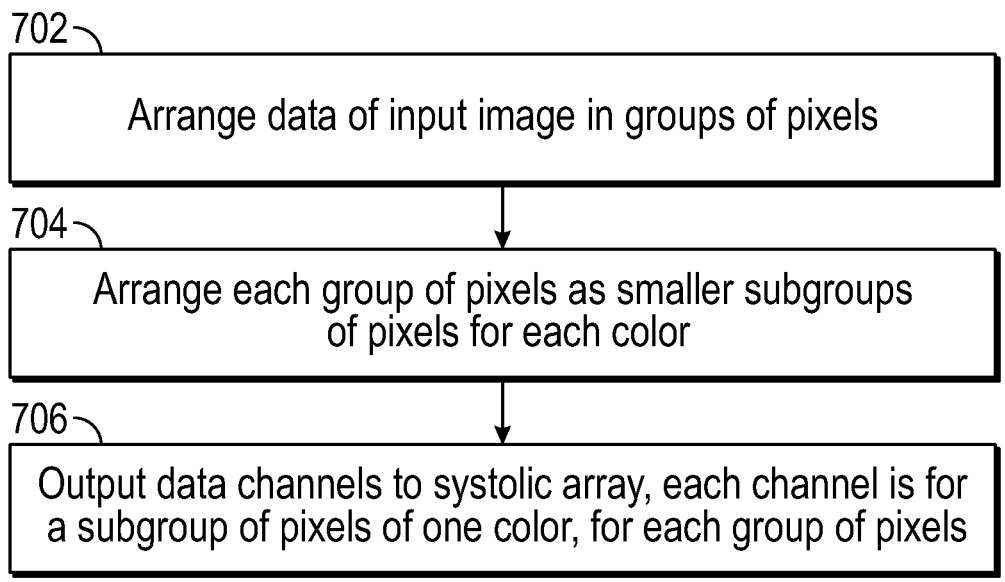
FIG. 7 is a flow diagram of a method of operating an AI engine, in an embodiment.

FIG. 7 is a flow diagram of a method of operating an AI engine, in an embodiment. The method and variations thereof can be performed by one or more processors, and more specifically can be performed by an AI engine with a data format converter as described herein in various embodiments. The method and variations thereof can be embodied in instruct ions on a tangible, non-transitory, computer-readable media, for execution by a processor.

In an action 702, the data format converter arranges the data of an input image in groups of pixels. Examples of groups of pixels are shown in FIGS. 2, 3 and 6, and further sizes of groups and arrangements of groups are readily devised in keeping with teachings herein.

In an action 704, the data format converter arranges each group of pixels as smaller subgroups of pixels for each color. Examples of subgroups of pixels in red, green and blue colors are shown in FIGS. 3 and 6, and further sizes of groups and subgroups, numbers of colors, and arrangements of subgroups are readily devised in keeping with teachings herein.

In an action 706, the data format converter outputs data channels to a systolic array. Each channel is for a subgroup of pixels of one color, for each group of pixels. Examples of output of data channels are shown in FIGS. 2, 3 and 6, and further numbers of channels and arrangements of groups of pixels, subgroups of pixels, color subgroups of pixels and corresponding channels are readily devised in keeping with teachings herein.

With reference to FIGS. 1-7, various embodiments of a data format converter reshape input images according to a MAC array configuration in hardware design. One or more data format converters reshape data entering the first couple of layers of a MAC array to a number of channels that is less than or equal to the number of PEs receiving the channels at that layer, with a data transformation designed to maximize the hardware utilization of the MAC array. Embodiments of a method described herein can apply to current AI engines or newly developing engines. The reshape can be done in other computation resources like a CPU or GPU, or the data transform in an AI engine. Reshaping so that the number of channels produced by the data format converter for input to one side of a systolic array is closer to, but less than or equal to the number of MAC PEs on the input side of the systolic array, results in greater MAC PE utilization in the first and second convolution layer inference(s) in the systolic array than would be so for inputting a lesser number of channels to the one side of the systolic array.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An artificial intelligence (AI) engine, comprising:
a systolic array of M by N MAC (multiply and accumulate) PEs (processing elements) having N MAC PEs on an input side of the systolic array; and
a data format converter to rearrange data of an input image having a pixel height and a pixel width in a first number of channels corresponding to a number of colors per pixel to a second number of channels, wherein the data of the input image is rearranged based on a hardware design of the systolic array, wherein the second number of channels is greater than the first number of channels and is not greater than N, each having data of a lesser pixel height, a lesser pixel width, and one of the number of colors per pixel, wherein the second number of channels is obtained by arranging each of a plurality of pixel groups of the input image in each of the first number of channels, wherein when the first number of channels is three associated with red, green and blue channels respectively, the second number of channels can be twelve, obtained by arranging each of a plurality of four pixel by four pixel groups of the input image in each of red, green and blue channels into four two pixel by two pixel groups for each of red, green and blue, with each of the four two pixel by two pixel groups in each color presented in a corresponding channel for a total of twelve channels;
wherein the systolic array is to receive and to process data of the second number of channels, such that more MAC PEs are utilized in a first and second convolution layer inference in the systolic array compared to inputting data of the first number of channels to the systolic array.

2. The AI engine of claim 1, wherein when:
M and N each is sixty-four, and
the first number of channels is three associated with red, green and blue channels respectively,
the second number of channels can be forty-eight, obtained by arranging each of a plurality of eight pixel by eight pixel groups of the input image in each of red, green and blue channels into sixteen two pixel by two pixel groups for each of red, green and blue, with each of the sixteen two pixel by two pixel groups in each color presented in a corresponding channel for a total of forty-eight channels.

3. The AI engine of claim 1, wherein the data format converter is implemented in a digital signal processor (DSP).

4. The AI engine of claim 1, wherein the data format converter is implemented in a reduced instruction set computer (RISC).

5. The AI engine of claim 1, further comprising:
a neural net core, having the systolic array of M by N MAC PEs implemented as an N by N MAC PE array with the data format converter implemented as a data transform module coupled to an input side of the N by N MAC PE array, and an accumulator coupled to an output side of the N by N MAC PE array;
a scaling module coupled to an output of the accumulator;
an activation module coupled to an output of the scaling module; and
a pooling module coupled to an output of the activation module.

6. The AI engine of claim 1, wherein each channel of the second number of channels comprises a plurality of pairs of pixels each comprising a first pixel and a second pixel that are adjacent in the each channel of the second number of channels but not adjacent in the input image.

7. A method of operating an artificial intelligence (AI) engine including a data format converter and a systolic array of M by N MAC (multiply and accumulate) PEs (processing elements) having N MAC PEs on an input side of the systolic array, and, comprising: arranging, based on a hardware design of the systolic array, data of an input image having a pixel height and a pixel width in a first number of channels corresponding to a number of colors per pixel to a second number of channels, wherein the second number of channels is greater than the first number of channels and is not greater than N, each having data of a lesser pixel height, a lesser pixel width, and one of the number of colors per pixel, wherein the second number of channels is obtained by arranging each of a plurality of pixel groups of the input image in each of the first number of channels, wherein
when the first number of channels is three associated with red, green and blue channels respectively;
the second number of channels can be twelve; and
the arranging data of the input image comprises arranging each of a plurality of four pixel by four pixel groups in each of red, green and blue channels into four two pixel by two pixel groups for each of red, green and blue, and presenting each of the four two pixel by two pixel groups in each color in a corresponding channel for a total of twelve channels; and
inputting data of the second number of channels to the systolic array, such that more MAC PEs are utilized in a first and second convolution layer inference in the systolic array compared to inputting data of the first number of channels to the systolic array.

8. The method of claim 7, wherein:
each of M and N is sixty-four; and
wherein when the first number of channels is three associated with red, green and blue channels respectively;
the second number of channels can be forty-eight; and
the arranging data of the input image comprises arranging each of a plurality of eight pixel by eight pixel groups in each of red, green and blue channels into sixteen two pixel by two pixel groups for each of red, green and blue, and presenting each of the sixteen two pixel by two pixel groups in each color in a corresponding channel for a total of forty-eight channels.

9. The method of claim 7, wherein the arranging the data of the input image to the second number of channels comprises arranging the data through a data format converter implemented in a digital signal processor (DSP).

10. The method of claim 7, wherein the arranging the data of the input image to the second number of channels comprises arranging the data through a data format converter implemented in a reduced instruction set computer (RISC).

11. The method of claim 7, wherein:
the arranging the data of the input image to the second number of channels is through a data format converter implemented as a data transform module in a neural net core;
the neural net core has the systolic array of M by N MAC PEs implemented as an N by N MAC PE array, with the data transform module coupled to an input side of the N by N MAC PE array, and an accumulator coupled to an output side of the N by N MAC PE array; and the method further comprises sending an output of the accumulator through a scaling module, an activation module and a pooling module.

12. The method of claim 7, wherein the arranging the data of the input image to the second number of channels comprises arranging each channel of the second number of channels to have a plurality of pairs of pixels each comprising a first pixel and a second pixel that are adjacent in the each channel of the second number of channels but not adjacent in the input image.

13. A non-transitory computer-readable medium having instructions stored therein which, when executed by a processor, cause the processor to perform operations, the operations comprising:
arranging data of an input image having a pixel height and a pixel width in a first number of channels corresponding to a number of colors per pixel to a second number of channels, wherein the data of the input image is rearranged based on a hardware design of a systolic array of M by N MAC (multiply and accumulate) PEs (processing elements) having N MAC PEs on an input side of the systolic array, wherein the second number of channels is greater than the first number of channels and is not greater than N, each having data of a lesser pixel height, a lesser pixel width, and one of the number of colors per pixel, wherein the second number of channels is obtained by arranging each of a plurality of pixel groups of the input image in each of the first number of channels, wherein
when the first number of channels is three associated with red, green and blue channels respectively;
the second number of channels can be twelve; and
the arranging data of the input image comprises arranging each of a plurality of four pixel by four pixel groups in each of red, green and blue channels into four two pixel by two pixel groups for each of red, green and blue, and presenting each of the four two pixel by two pixel groups in each color in a corresponding channel for a total of twelve channels; and
inputting data of the second number of channels to the systolic array, such that more MAC PEs are utilized in a first and second convolution layer inference in the systolic array compared to inputting data of the first number of channels to the systolic array.

14. The non-transitory computer-readable medium of claim 13, wherein:
each of M and N is sixty-four; and
wherein when the first number of channels is three, for red, green and blue channels;
the second number of channels is forty-eight; and
the arranging data of the input image comprises arranging each of a plurality of eight pixel by eight pixel groups in each of red, green and blue channels into sixteen two pixel by two pixel groups for each of red, green and blue, and presenting each of the sixteen two pixel by two pixel groups in each color in a corresponding channel for a total of forty-eight channels.

15. The non-transitory computer-readable medium of claim 13, wherein the arranging the data of the input image to the second number of channels comprises arranging the data through a data format converter implemented in a digital signal processor (DSP).

16. The non-transitory computer-readable medium of claim 13, wherein the arranging the data of the input image to the second number of channels comprises arranging the data through a data format converter implemented in a reduced instruction set computer (RISC).

17. The non-transitory computer-readable medium of claim 13, wherein the arranging the data of the input image to the second number of channels comprises arranging each channel of the second number of channels to have a plurality of pairs of pixels each comprising a first pixel and a second pixel that are adjacent in the each channel of the second number of channels but not adjacent in the input image.

* * * * *